(No Model.) 3 Sheets—Sheet 2.
J. C. COURTNEY.
DROP MECHANISM FOR CORN PLANTERS.
No. 534,361. Patented Feb. 19, 1895.
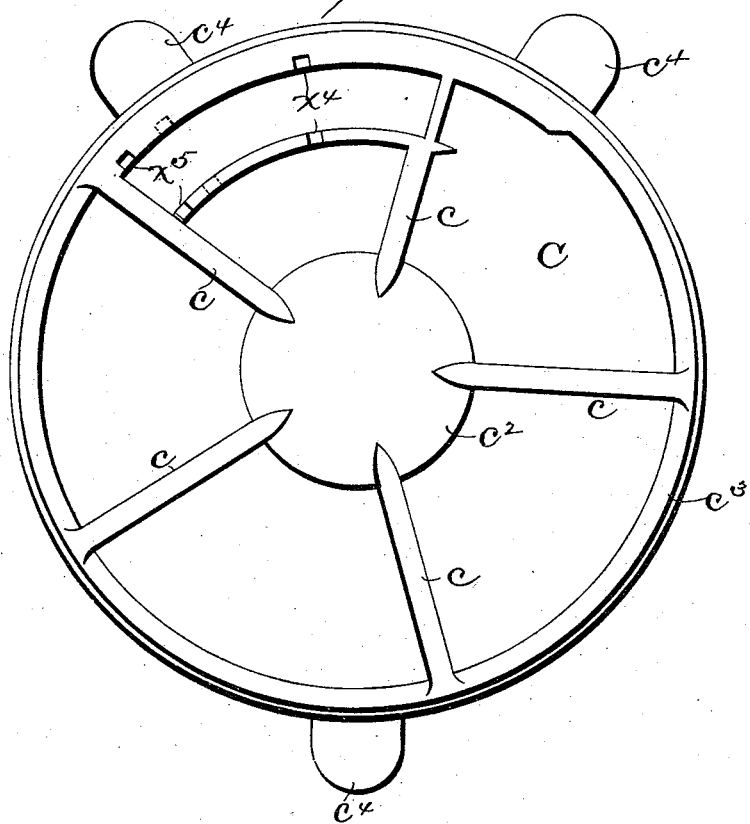
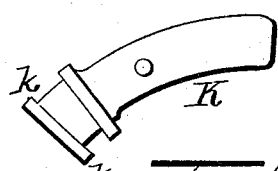
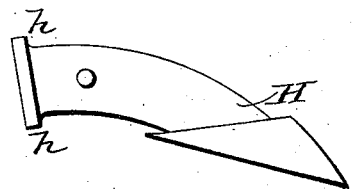
Witnesses
C. J. Nottingham
G. F. Downing
Inventor
J. C. Courtney
By H. A. Seymour
Attorney (No Model.) 3 Sheets—Sheet 3.
J. C. COURTNEY.
DROP MECHANISM FOR CORN PLANTERS.
No. 534,361. Patented Feb. 19, 1895.
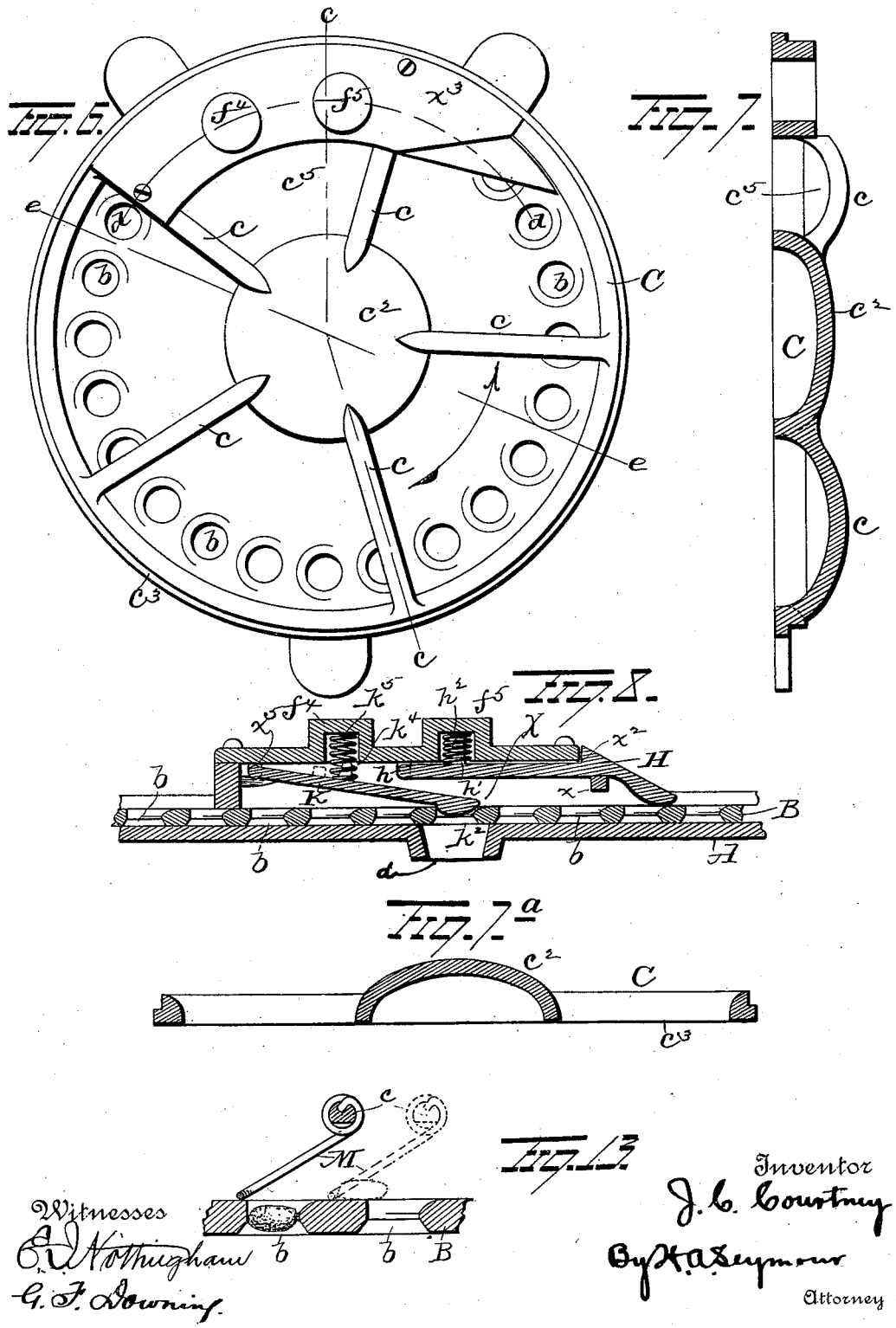
Witnesses
C. W. Nothingham
G. F. Downing
Inventor
J. C. Courtney
By H. A. Seymour
Attorney

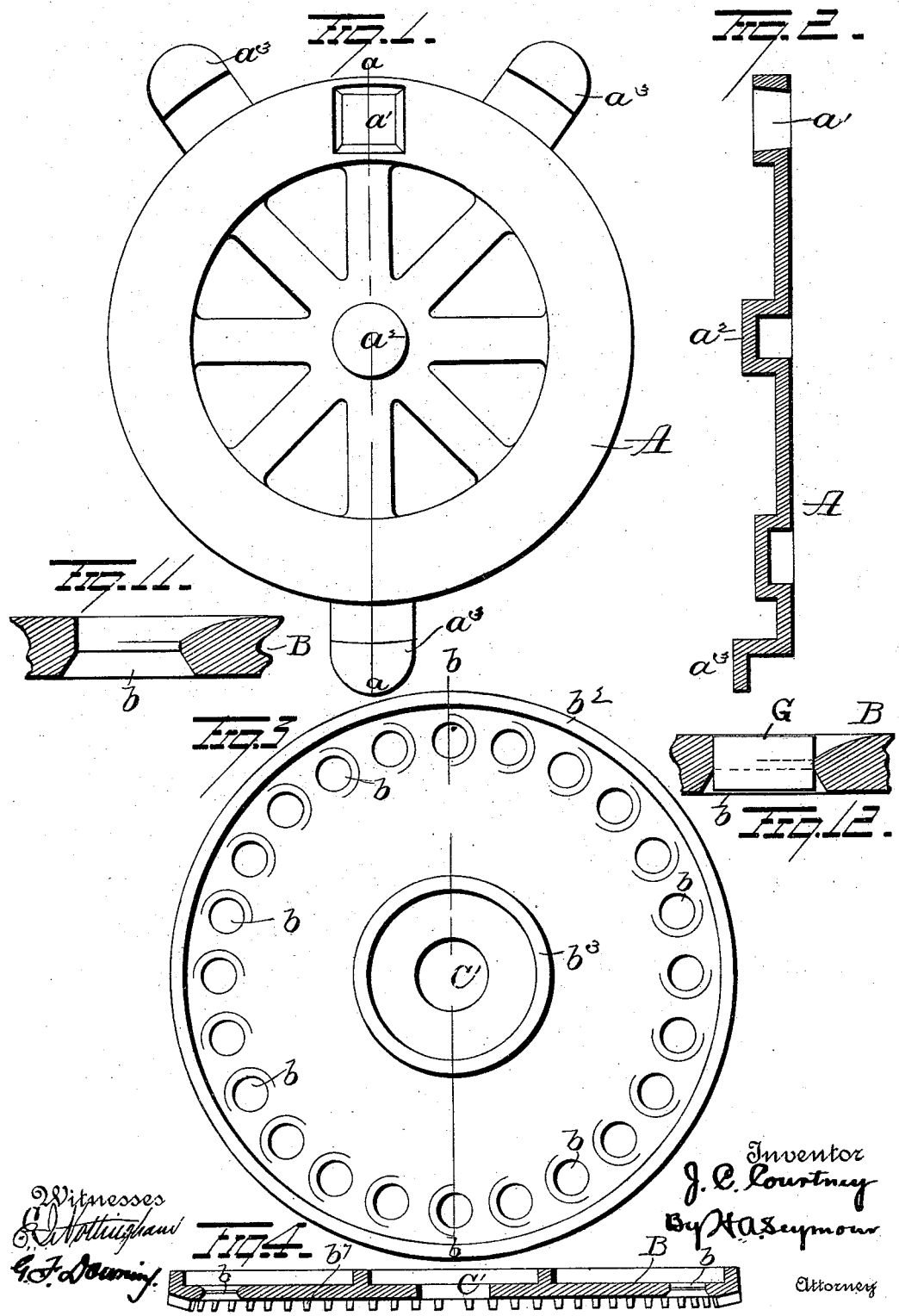

UNITED STATES PATENT OFFICE.

JOHN C. COURTNEY, OF STREATOR, ILLINOIS, ASSIGNOR OF ONE-HALF TO F. PLUMB, OF SAME PLACE.

DROP MECHANISM FOR CORN-PLANTERS.

SPECIFICATION forming part of Letters Patent No. 534,361, dated February 19, 1895.

Application filed September 8, 1894. Serial No. 522,477. (No model.)

*To all whom it may concern:*

Be it known that I, JOHN C. COURTNEY, of Streator, in the county of La Salle and State of Illinois, have invented certain new and useful Improvements in Drop Mechanism for Corn-Planters; and I do hereby declare the following to be a full, clear, and exact description of the invention, such as will enable others skilled in the art to which it appertains to make and use the same.

My invention relates to an improvement in drop mechanism for corn planters, the object being to provide means for effectually dropping one kernel or grain at a time into the discharge and it consists in certain novel features of construction and combinations of parts which will be hereinafter described and pointed out in the claims.

In the accompanying drawings, Figure 1 is a plan view of the bottom plate. Fig. 2 is a cross section of this plate on line $a$—$a$ of Fig. 1. Fig. 3 is a view of the seed plate. Fig. 4 is a section on line $b$—$b$ of Fig. 3. Fig. 5 is a view of the top plate. Fig. 6 is a view showing the parts assembled. Fig. 7 is a section on line $c$—$c$ of Fig. 6. Fig. $7^a$ is a similar view, on line $e$—$e$. Fig. 8 is a section on the curved line $d$—$d$ of Fig. 6. Fig. 9 is a detached view of the cut-off. Fig. 10 is a similar view of the knocker. Fig. 11 is an enlarged section through one of the holes $b$. Fig. 12 is a similar view showing the button G in place in the hole, and Fig. 13 is a detail.

A represents a base plate. This comprises a raised annular ring, a central web and a central bearing pivot $a^2$. B is the seed disk. This is provided with a central opening C' adapted to receive the bearing pivot $a^2$ of plate A on which it turns as a pivot. The disk B in turning rests upon the raised annular portion of plate A and it is provided with holes $b, b$ adapted to receive one kernel of grain each and discharge it when the opening $a'$ in plate A is reached and retain the grain while traversing the imperforate raised annular portion of the plate A which serves as a bottom for the holes. The disk is furnished on its upper face with two annular flanges one $b^2$ at the outer edge and the other $b^3$ near the central hole $c'$ and between these flanges the grain is retained. The holes $b$ are of peculiar construction as shown in Fig. 11, the object of this construction being to prevent the lodgement of more than one kernel of corn in the hole at the time of discharge. The hole is vertical or nearly so as far as the center of the plate about half way around and the remaining half is countersunk while the lower end of the hole is beveled, thus leaving a central vertical portion between the upper and lower ends the object of the beveled lower portion being to facilitate the escape of the kernel whereas the object of the peculiar construction of the upper end of the hole is to make easy the removal of supernumerary kernels collecting in the holes. Disk B is provided on its lower face with peripheral teeth $b^7$ by means of which the disk is rotated by suitable gearing.

C is the top plate between which and the bottom plate the rotary disk is located. Plates A and C are provided with projections $a^3$ and $c^4$ respectively which correspond in position and by means of which the two plates are secured together. This plate C comprises the outer rim $c^3$, the central hub $c^2$ which bears upon flange $b^3$ of disk B and the bridge braces $c, c$, which extend radially from the hub to the rim.

A cut off box X is located at one side of top plate C and over this a cover $x^3$ is secured. This box is located over the opening $a'$ in plate A. A gate or rake H is pivoted by means of trunnions $h, h$, at one end in bearings $x^4, x^4$ and one end, the free end, protrudes outside of the forward end of the cut-off box. This protruding end is beveled off after the manner of a plow share and is adapted to clear the holes $b$ of supernumerary kernels of corn as they pass into the cut-off box and throw such kernels to one side into the recess $c^5$ from which they are again gathered into the holes on some future round. This gate or rake H is yieldingly supported as well as pivoted in the box, a recess $x^2$ being formed for its clearance. The gate or rake is held normally depressed by the spiral spring $h^2$ on the lug $h'$ in box $f^5$ and the bar $x$ prevents this gate or rake from dropping too far.

It has been found that a light running scraper M riding over the top of the revolving seed plate in the path of the seed holes is a desirable accessory to the drop. These scrapers M are best made of wire and fastened at several places preferably to the bridge braces c, c, c, or to some other convenient place. These light riding scrapers are useful in scraping the kernels down into the seed holes thus insuring the filling of all the holes before they reach the gate or rake H. Of course other forms of scrapers might be used if desired, these merely being described as having been found desirable.

It occasionally happens that a kernel of corn requires a little force to get it through the hole. For this purpose I have provided a knocker K the trunnions $k$, $k$ of which are pivoted in bearings $x^5$ $x^5$ in cut-off box X. The free end $k^2$ of this knocker is constructed to engage the kernels and force them through the holes if necessary and to insure a sharp quick action a small spiral spring $k^5$ on the lug $k^4$ in box $f^4$ bears down upon the knocker. As shown in Fig. 8 the knocker is located over the opening $a'$ and as its lower face is curved it easily rides from one hole to the next and so on.

It sometimes happens that the corn is fed too fast by the use of all of the holes. In this case filling buttons such as shown in Fig. 12 are inserted in the holes. The drop mechanism is placed in the bottom of the hopper in the usual manner and every kernel is deposited individually in the discharge spout.

It is evident that slight changes might be resorted to in the form and arrangement of the several parts described without departing from the spirit and scope of my invention and hence I do not wish to limit myself to the exact construction herein set forth, but, Having fully described my invention, what I claim as new, and desire to secure by Letters Patent, is—

1. In drop mechanism for corn planters, a rotary disk having holes formed therein, the upper and lower ends of each hole having an inclining wall and the central portion of each hole between these ends having a vertical wall, substantially as set forth.

2. In drop mechanism, a rotary disk, having holes therein, the upper half of each hole having an inclined and a vertical wall, and lower half an inclined or countersunk wall, substantially as set forth.

3. In drop mechanism for corn planters, the combination with a rotary disk, said disk having holes formed therein, the walls of which are part vertical and part inclined, of a gate or rake for removing supernumerary kernels from the holes, substantially as set forth.

4. In drop mechanism for corn planters, the combination with a rotary disk having holes therein, the walls of the upper half of the holes, part vertical and part inclined and the wall of the lower half inclined, of spring actuated gate and knocker, substantially as set forth.

5. In drop mechanism for corn planters, the combination with a rotary disk having holes therein, the walls of the upper half of the holes part vertical and part inclined and the wall of the lower half inclined, of a spring actuated gate, a knocker, and a scraper, substantially as set forth.

In testimony whereof I have signed this specification in the presence of two subscribing witnesses.

JOHN C. COURTNEY.

Witnesses:
F. R. GRANT,
GEO. GOULDING.